United States Patent
Ellery-Guy

Patent Number: 5,934,223
Date of Patent: Aug. 10, 1999

[54] PET TOY

[76] Inventor: Erin P. Ellery-Guy, 3617 E. Broadway #15, Long Beach, Calif. 90803

[21] Appl. No.: 09/015,418

[22] Filed: Jan. 29, 1998

[51] Int. Cl.$^6$ .................................................. A01K 15/02
[52] U.S. Cl. ........................... 119/702; 362/35; 362/272; 362/811; 40/502; 40/473
[58] Field of Search .................... 119/702, 707, 119/708; 40/502, 560, 473; 362/35, 421, 809, 811, 271, 272, 383, 386, 233, 414

[56] References Cited

U.S. PATENT DOCUMENTS

| | | | |
|---|---|---|---|
| 917,137 | 4/1909 | Robinson | 362/35 |
| 1,071,900 | 9/1913 | Edison | 362/35 |
| 2,174,047 | 9/1939 | Stainbrook | 40/560 |
| 2,204,435 | 6/1940 | Musaphia | 40/431 |
| 2,371,172 | 3/1945 | Hotchner | 40/436 |
| 3,304,651 | 2/1967 | Deyerl | 446/439 |
| 3,401,596 | 9/1968 | Hirsch . | |
| 3,627,926 | 12/1971 | Nichols | 348/835 |
| 3,749,903 | 7/1973 | Belokin, Jr. | 40/431 |
| 3,808,721 | 5/1974 | Gersch | 40/432 |
| 4,173,038 | 10/1979 | Kiefer | 362/35 |
| 4,285,028 | 8/1981 | Sundin et al. | 362/35 |
| 4,391,224 | 7/1983 | Adler . | |
| 4,533,982 | 8/1985 | Kozar . | |
| 4,937,713 | 6/1990 | Holt et al. . | |
| 4,942,502 | 7/1990 | Ohashi | 362/35 |
| 4,972,305 | 11/1990 | Blackburn | 362/234 |
| 5,084,803 | 1/1992 | Lan | 362/35 |
| 5,233,375 | 8/1993 | Williams et al. . | |
| 5,253,000 | 10/1993 | Stoeckner . | |
| 5,311,226 | 5/1994 | Karasawa . | |
| 5,324,224 | 6/1994 | Anderson et al. | 446/91 |
| 5,367,349 | 11/1994 | Zeiler . | |
| 5,517,264 | 5/1996 | Sutton . | |
| 5,555,658 | 9/1996 | Yu | 40/554 |

Primary Examiner—Michael J. Carone
Assistant Examiner—James S. Bergin
Attorney, Agent, or Firm—Fasth Law Offices; Rolf Fasth

[57] ABSTRACT

The pet toy projects a moving image into a room, as determined by a computer chip, so that a pet may be entertained by the moving image without requiring a person to be in the room to move the image. The pet toy comprises an upright housing containing batteries and supported by a heavy base with a ball bearing unit at the top of the housing. The ball bearing unit has a lamp unit attached thereto. A plurality of glass units with various cut-outs that may be removably attached to the lamp unit so that the glass units may be used to change the image projected by the lamp unit. A control unit contained in the housing controls the speed of the rotatable ball bearing unit to control the speed of the moving light image.

8 Claims, 2 Drawing Sheets

PET TOY

TECHNICAL FIELD

The invention relates to a pet toy that may project an image of a prey, such as an image of a mouse, that moves around randomly.

BACKGROUND INFORMATION AND SUMMARY OF THE INVENTION

In practically every pet store and other stores there may be purchased a wide variety or toys for domestic animals such as cats and doge. Different types of balls, bones, toys which squeak etc. can be purchased. In almost every case, each of the toys is passive. The only way that any of the toys can become movable is through the toy being thrown by a human being or upon the toy being moved by the animal itself.

It is well known that domestic animals love to chase anything that moves. One objective of the present invention is to construct a pet toy which automatically projects a randomly moving light image of a prey, such as an image of a mouse or bird, thereby freeing the owner from the sometimes onerous and time consuming duty of entertaining a bored, unhappy pet, and at the same time providing the pet owner with the pleasurable entertainment of watching his/her active pet. It is the unique utilization of this chase instinct in most animals by this pet toy that makes it especially attractive and useful as a pet toy.

More particularly, the pet toy of the present invention is a pet toy that projects a moving image into a room, as determined by a computer chip, so that a pet may be entertained by the moving image without requiring a person to be in the room to move the image. The pet toy comprises an upright housing containing batteries and supported by a heavy base with a ball bearing unit at the top of the housing. The ball bearing unit has a lamp unit attached thereto. A plurality of glass units with various cut-outs that may be removably attached to the lamp unit so that the glass units may be used to change the image projected by the lamp unit. A control unit contained in the housing controls the speed of the rotatable ball bearing unit to control the speed of the moving light image.

DETAILED DESCRIPTION

Figure 1:
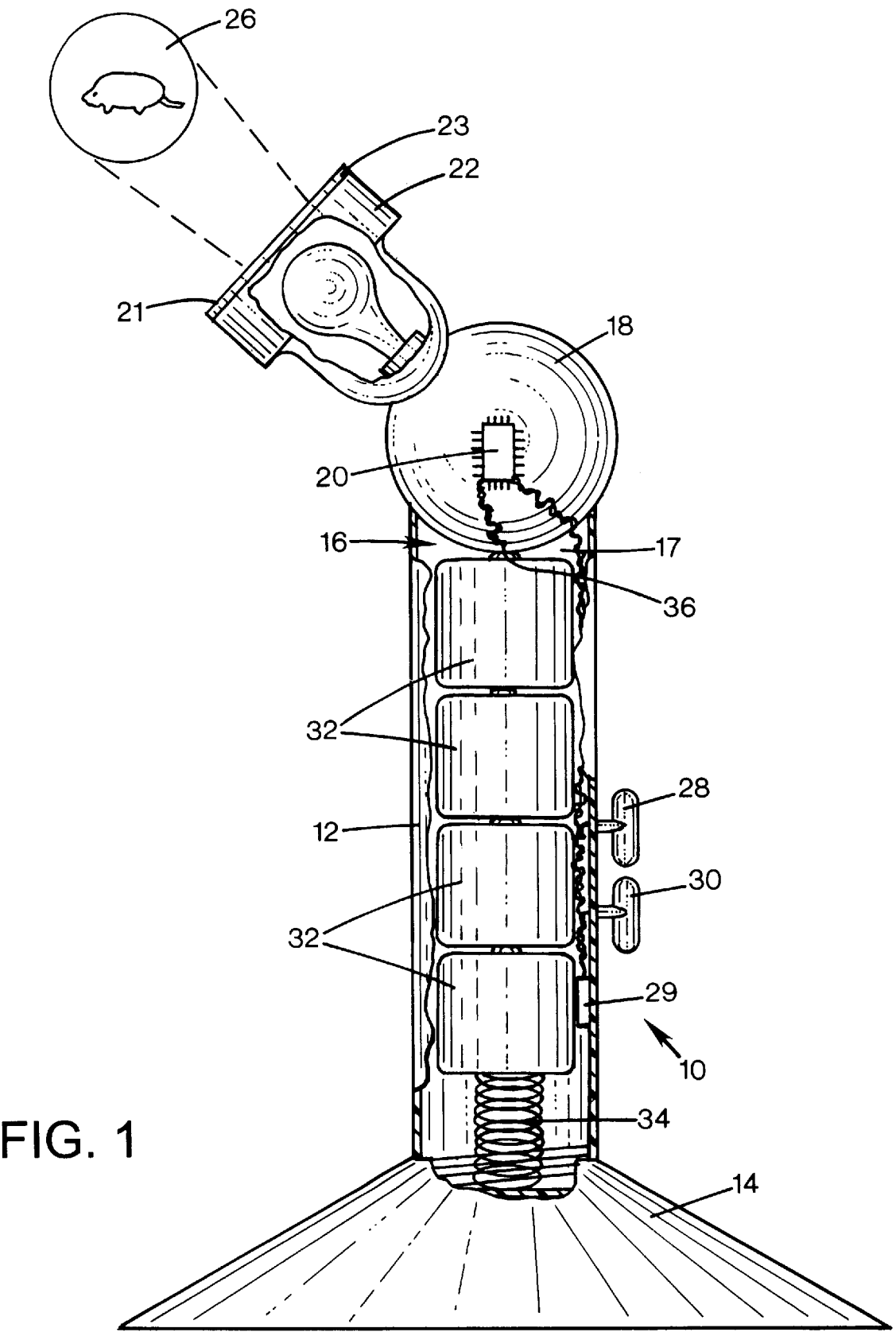
FIG. 1 is a perspective view of the pet toy of the present invention.
Figure 2:
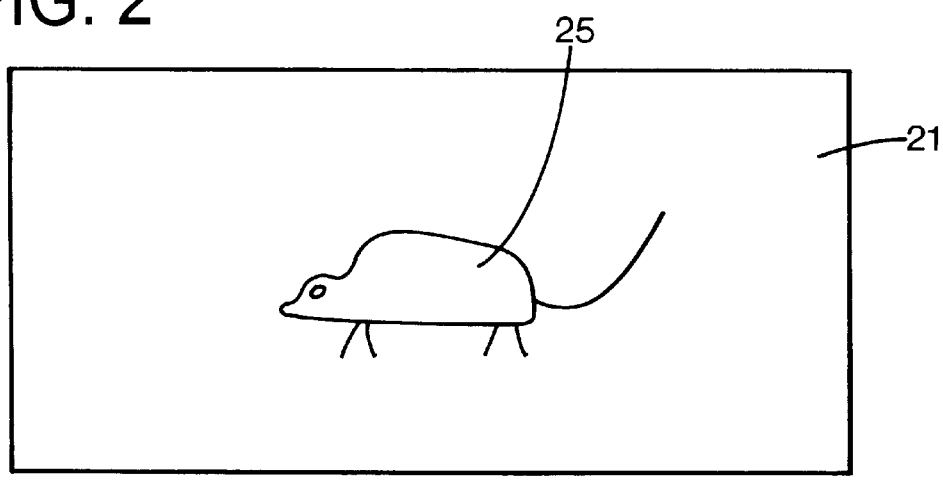
FIG. 2 is a side view of the glass cut out.

With reference to FIGS. 1–2, the pet toy 10 of the present invention has a vertical housing 12 supported by a sturdy heavy metal stand 14.

The housing 12 is preferably upright and may be provided in different heights. The housing 12 may be about 12 " high for cats and about 20 " high for dogs. The housing may of course have any suitable height and size depending upon the owner's preferences. The metal stand 14 preferably is conical shaped and has a sufficient weight to provide adequate support of the vertical housing 12 and to prevent the pet toy 10 from being easily knocked over. The metal stand 14 may be removably attached to the vertical housing 12 so that the metal stand can be conveniently removed from the vertical housing 12. For example, the vertical housing 12 may have a threaded lower section that is adapted to be screwed into an opening defined at a top portion of the metal stand 14.

An upper end 16 of the housing 12 may have a semi-spherical cavity 17 defined therein to receive a spherical shaped ball bearing unit 18. The cavity 17 is dimensioned to snugly receive the ball bearing unit 18 while permitting 360 degrees rotational movement of the ball bearing unit 18. In this way, the ball bearing unit 18 is rotatably attached to the housing 12 so that it is possible to completely rotate the ball bearing unit sideways and up and down. The movements of the ball bearing unit 18 may be controlled by an integrated circuit or any other suitable computer chip 20 disposed inside the ball bearing unit 18. Preferably, the computer chip 20 is programed to randomly rotate the ball bearing unit 18 within the cavity 17. It is to be understood that the computer chip 20 may be any programmable unit that is capable of being programmed to randomly rotate the ball bearing unit 16 and the computer chip 20 may disposed outside the ball bearing unit such as inside the housing 12. The computer chip 20 may also be programmable to control the speed of the rotational movement of the ball bearing unit 18. It is to be understood that the movement of the ball bearing unit say not be according to a random pattern.

A light source such as a lamp unit 22 may be attached to or in operative engagement with the ball bearing unit 18. The lamp unit 22 may include a base so that a conventional light bulb may be screwed into the base. It is to be understood that any suitable light emitting source may be used as long as a sufficiently strong light beam is produced by the light emitting source. The lamp unit 22 may also be disposed inside the ball bearing unit 18.

The lamp unit 22 may have a sheet material 21 that is removably attached to the lamp unit 22. The sheet material 21 may comprise a conventional plastic, metal or glass that may be removably attached to a sheet holder 23 of the lamp unit 22. For example, the sheet material 21 may be screwed onto the lamp unit 22. The shoot material may also comprise a magnifying glass that may be used if it is desirable to enlarge the prey image projected. The sheet material 21 may have a cut-out 25 defined therein so that a mouse, dog, bird, star etc. image 26 may be produced by the solid light beam of the lamp unit 22. If desired, a plurality of interchangeable sheet material that have different cut-outs may be used to change the prey image produced by the lamp unit 22 when the light shines through the cut-out of the sheet material 21. In this way, the most favored image by the pet may be selected. It is important to note that the lamp unit 22 should produce a solid light beam that has a relatively focused and sharp image so that the image projected in clearly distinguishable from the general illumination of the room.

The housing 12 may have a switch 28 for turning on/off the pet toy 10. For example, the switch 28 may be used to turn off the light of the lamp unit 22 and the movement of the ball bearing unit 18 and thus the speed of the prey image, The switch 28 may also be connected to a timer so that the pet toy will be turned on a predetermined time and for a predetermined time period. The switch 28 may also be associated with a beeper or horn 29 so that the pet animal may be alerted when the pet toy is turned on. Additionally, the pet toy 10 may have a control mechanism for limiting the range of movement of the ball bearing unit 18. The housing 12 may also have a control unit 30 for controlling the speed of the movements of the ball bearing unit 18. As mentioned earlier, the speed of the movement of the ball bearing unit 18 may also be determined by the computer chip 20. The housing 12 may hold a plurality of batteries 32 to power the pet toy 10. At the bottom of the housing 12 there may be a spring 34 to bias the batteries 32 upwardly against a contact surface 36. Of course, the pet toy 10 may be adapted to be plugged into an electrical wall unit.

In operation, the pet toy 10 may be placed in the middle of a room and turned on by the switch 28 so that a cat or any other pet may be entertained by the moving mouse image 26. The control mechanism may be used to control the speed of the moving image and the range of movement of the image 26. One important advantage of the invention is that it is possible to entertain a cat without requiring a person to be in the room to direct the movements of the mouse image 26.

Figure 3:
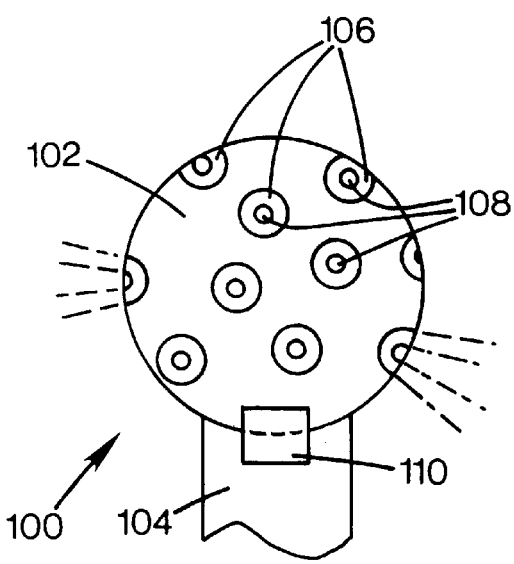
FIG. 3 is a perspective view of a top portion of an alternative embodiment of a pet toy.

In an alternative embodiment, as shown in FIG. 3, the pet toy 100 has a stationary spherical unit 102 that may be removably attached to an upright housing 104. The spherical unit 102 may have a plurality of openings 106 defined therein. Preferably, the openings 106 should be evenly distributed about the surface of the spherical unit 102. A light source 108 is disposed inside each opening 106. A computer chip such as a integrated circuit 110 is preferably connected to each light source 108 so that the computer chip may randomly turn on and turn off the various light sources 108 disposed inside the openings 106 so that the light images may be displayed on the floor, walls, ceilings etc. to entertain a cat or a dog. For example, the integrated circuit may be programed to turn on and off the light sources in a certain pattern or according to a random pattern. One feature of this embodiment is that it is not necessary to rotate the spherical unit 102 because the pet may perceive the light images as moving although the spherical unit 102 is not rotated.

Figure 4:
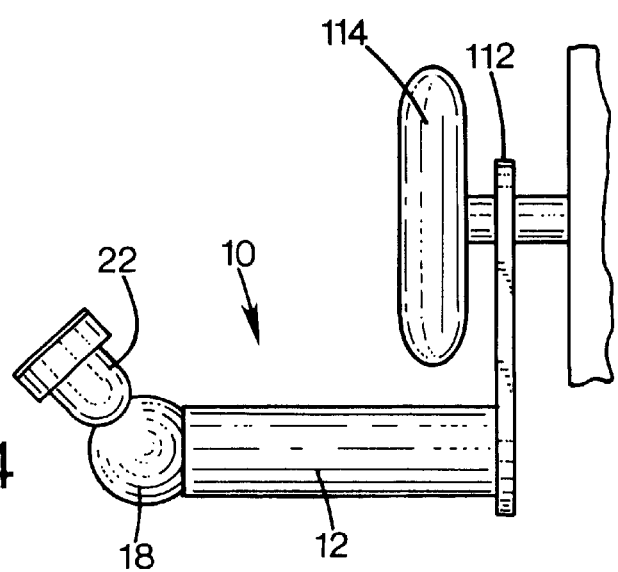
FIG. 4 is a perspective view of an attachment member that is attached to a housing member of the pet toy of the present invention.

In yet an alternative embodiment, an shown in FIG 4, an attachment member 112, such as a hook shaped member, may be attached to the vertical housing 12 (having the stand removed therefrom) so that the pet toy 10 can be hung at a suitable place such as on a door knob 114.

While the present invention has been described in accordance with preferred compositions and embodiments, it is to be understood that certain substitutions and alterations may be made thereto without departing from the spirit and scope of the following claims.

I claim:

1. A pet toy for entertaining a pet animal, comprising:

a housing;

a ball bearing unit rotatably attached to the housing;

an integrated circuit in operative engagement with the ball bearing unit to move the ball bearing unit in a random pattern, a light source attached to the ball bearing unit, the light source producing a light beam; and a sheet material directly attached to the light source, the sheet material having a cut out defined therein, the cut out having a predetermined shape so that a light image of the predetermined shape is produced when the light beam shines through the cut out of the sheet material.

2. The pet toy according to claim 1 wherein the pet toy further comprises a switch attached to the housing for turning on and off the pet toy.

3. The pet toy according to claim 1 wherein the pet toy further comprises a speed control attached to the housing for increasing and reducing a speed of the movement of the ball bearing unit.

4. The pet toy according to claim 1 wherein the sheet material is screwed into the light source.

5. The pet toy according to claim 1 wherein the pet toy further comprises a hook shaped attachment member that is attached to the housing.

6. A pet toy, comprising:

a housing having a semi-spherical cavity defined at a top portion of the housing;

a ball bearing unit rotatably disposed inside the semi-spherical cavity of the housing;

an integrated circuit in operative engagement with the ball bearing unit to randomly move the ball bearing unit;

a light source attached to the ball bearing unit, the light source producing a light beam; and the pet toy further comprises sheet material directly attached to the light source, the sheet material having a cut out defined therein, the cut out depicting an animal so that a light image of the animal is produced when the light beam shines through the cut out of the sheet material.

7. The pet toy according to claim 6 wherein the cut out defines an image selected from the group consisting of a mouse, bird, star, cat and dog.

8. A pet toy, comprising:

a housing having a semi-spherical cavity defined at a top portion of the housing;

a ball bearing unit rotatably disposed inside the semi-spherical cavity of the housing;

an integrated circuit in operative engagement with the ball bearing unit to randomly move the ball bearing unit;

a light source attached to the ball bearing unit, the light source producing a light beam; and the integrated circuit being disposed within the ball bearing unit.

\* \* \* \* \*